United States Patent [19]
Powell

[11] 3,848,632
[45] Nov. 19, 1974

[54] VALVE

[75] Inventor: Walter W. Powell, Houston, Tex.

[73] Assignee: Anderson, Greenwood & Co., Bellaire, Tex.

[22] Filed: Oct. 9, 1973

[21] Appl. No.: 404,279

[52] U.S. Cl. .................................. 137/514, 92/182
[51] Int. Cl. ............................................ F16k 15/06
[58] Field of Search .............. 137/514, 514.5, 514.7; 92/182

[56] References Cited
UNITED STATES PATENTS

| | | | |
|---|---|---|---|
| 1,175,484 | 3/1916 | Stokes | 137/514.5 X |
| 2,541,395 | 2/1951 | Wilson | 137/514.5 |
| 2,914,085 | 11/1959 | Mercier | 137/514 |

*Primary Examiner*—Robert G. Nilson
*Attorney, Agent, or Firm*—Jack R. Springgate; Joe E. Edwards; M. H. Gay

[57] ABSTRACT

A pressure responsive valve having a body defining an inlet, an outlet, a valve seat surrounding the communication through the body between said inlet and said outlet and a bore having cylindrical walls in alignment with said valve seat, a valve member positioned within said body and adapted to reciprocate to open and close flow through said valve seat and having an O ring groove around a portion of said valve member which reciprocates within said bore, an O ring in said groove and a communication defined through said valve member to exert pressure from the area of said valve seat to the interior of said O ring groove whereby the O ring is energized into engagement with the walls of said bore to provide a drag resisting the movement of said valve member. This abstract is neither intended to define the invention of the application which, of course, is measured by the claims, nor is it intended to be limiting as to the scope of the invention in any way.

6 Claims, 3 Drawing Figures

VALVE

BACKGROUND OF THE INVENTION

Certain pressure responsive valves, particularly spring loaded pressure relief valves may have a tendency to chatter. The prior application Ser. No. 113,303, filed Feb. 16, 1973, now abandoned, discloses a valve having various types of pressure energized friction devices to eliminate chatter in the movement of valve members and pistons. The present invention relates to providing an improved structure of a relief valve in which a simple O ring which is to be energized into frictional engagement to provide the drag for damping chatter in the movement of the valve member is placed in communication with the fluid pressure within the valve.

SUMMARY

The present invention relates to an improved pressure responsive valve in which the movement of its valve member is provided with a pressure energized O ring to damp its movement.

An object of the present invention is to provide an improved pressure responsive valve in which a simple structure damps the movement of the valve member to prevent chatter thereof.

Another object is to provide an improved pressure responsive valve having a damping for the valve member without requiring more than a simple O ring and a suitable passageway.

BRIEF DESCRIPTION OF THE DRAWINGS

These and other objects and advantages of the present invention are hereinafter more fully set forth and explained with reference to the drawings wherein.

DESCRIPTION OF THE PREFERRED EMBODIMENTS

Figure 1:
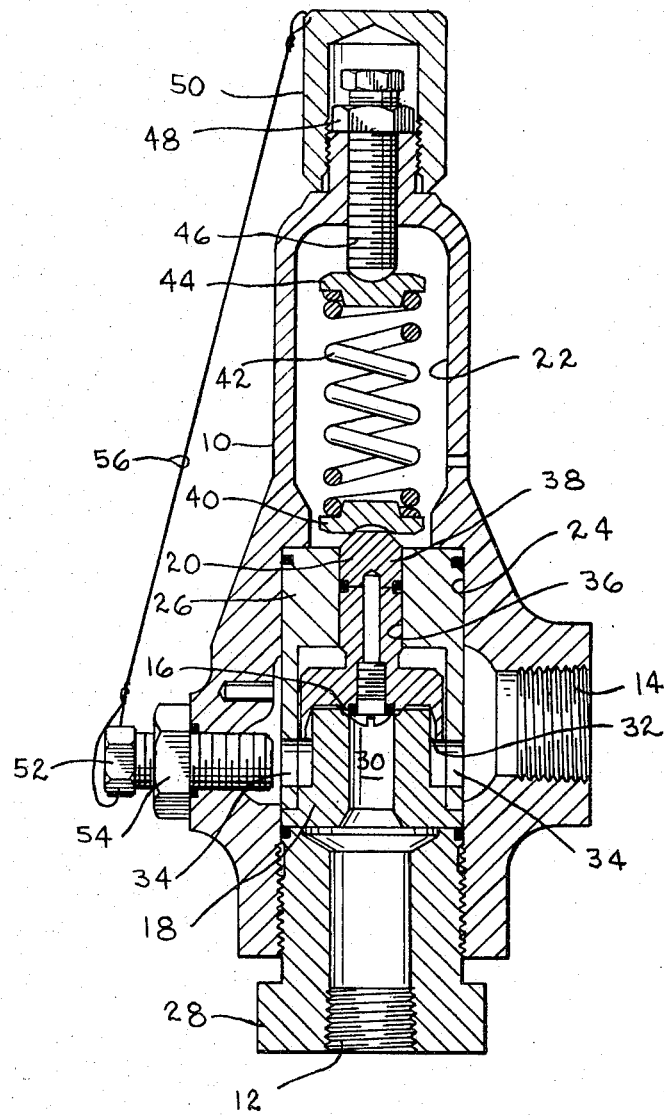
FIG. 1 is a sectional view of a pressure relief valve of the present invention.

The pressure relief valve illustrated in FIG. 1 includes a body 10 having an inlet 12, an outlet 14, a valve seat 16 on the nozzle 18 with the valve seat 16 being positioned in surrounding relation to the communication established between the inlet 12 and outlet 14 through body 10 and nozzle 18, and a valve member 20 positioned within said body and adapted to move therein and thereby control the flow through said valve seat 16.

The body 10 defines the upper spring chamber 22 and the lower valve chamber 24. The cage guide 26 and the nozzle 18 are retained within the lower valve chamber 24 by the bushing 28 which also functions to define the inlet 12. The nozzle 18 extends within cage guide 26 and is spaced radially therefrom. Valve seat 16 is defined around the passage 30 through nozzle 18 and when not engaged by valve member 20 is in communication through the annular space 32 between nozzle 18 and cage guide 26 and the ports 34 in cage guide 26 with the outlet 14.

The upper part of cage guide 26 defines a bore 36 extending therethrough which receives the spindle portion 38 of valve member 20. When valve member 20 is seated on valve seat 16, the end of spindle 38 extends outward from cage guide 26 and is engaged by the spring washer 40. The spring 42 which is positioned between the washer 40 and 44 provides the means biasing the valve member 20 toward seated position on valve seat 16. The force exerted by spring 42 is adjusted by the screw 46 extending to the exterior of the body 10 and is held in place by lock nut 48. The upper end of body 10 is closed by the cap 50.

The blowdown adjusting screw 52 is threaded through body 10 and terminates in close spaced relationship to the port 34 opposite outlet 14. Turning of adjusting screw 53 causes it to restrict or open flow through the ports 34 and thereby provides the desired degree of blowdown each time the valve is unseated. Lock nut 54 locks the adjusting screw 52 in its set position. Further sealing wire 56 is connected between cap 50 and screw 52 to assure that no change is made in the adjustments of the opening pressure setting by adjusting the force exerted by spring 42 and of blowdown by adjusting the screw 52.

Figure 2:
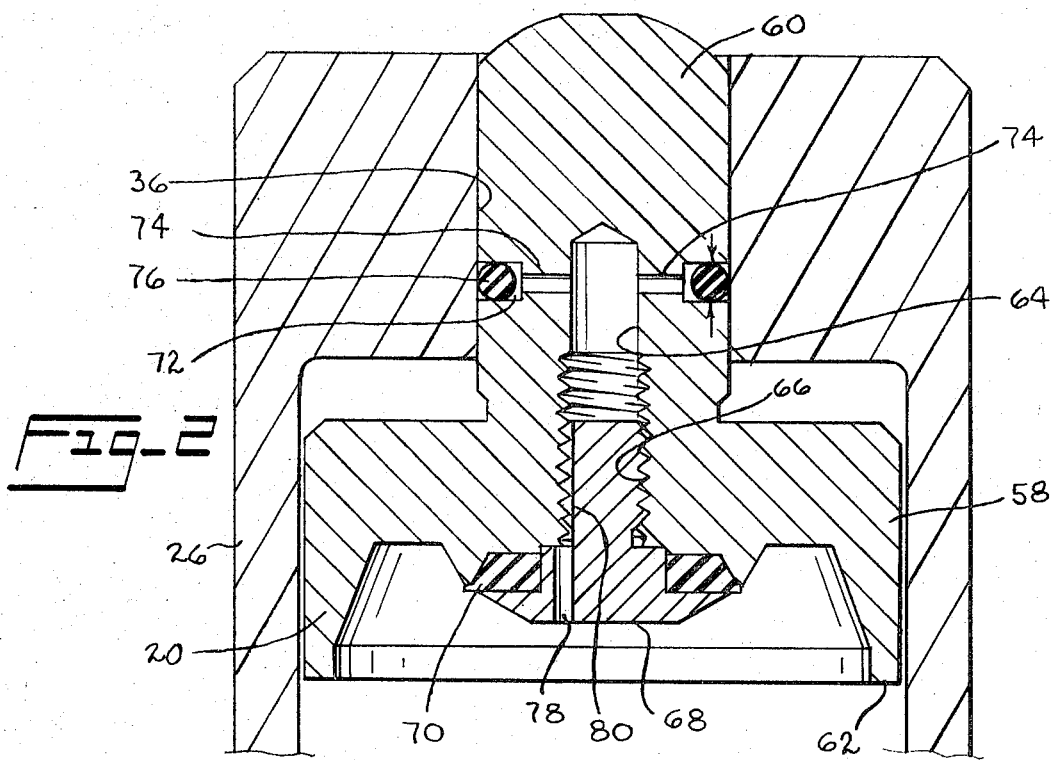
FIG. 2 is a detailed sectional of the preferred form of the valve member of the present invention illustrating the details of the damping structure.

One form of damping structure for the valve member 20 is illustrated in FIG. 2 wherein the valve member 20 includes a base 58, the stem 60 which is positioned within the bore 36 and the skirt 62 depending from the outer periphery of base 58. The valve member 20 is bored to provide the recess 64 extending into stem 60 as shown. The outer portion of recess 64 is threaded as at 66 to receive the retainer screw 68. Seating ring 70, which is of a suitable material, and is adapted to engage valve seat 16 to provide sealing engagement therewith, is retained in position as shown by engagement of the head of screw 68 around its inner periphery as shown.

The groove 72 aroung the intermediate portion of the stem 60 is in communication with the recess 64 through the radial passages 74 in stem 60. The 0 ring 76 is positioned in groove 72. Communication to recess 64 is provided by the passage 78 through the head of screw 68 and the groove 80 extending along the shank of screw 68.

Since the primary function of 0 ring is to provide a drag or friction force resisting the movement of valve member 20, the groove 72 is of a dimension in width so that the 0 ring 76 is compressed between the sides of groove 72 rather than between the bottom of the groove and the wall of bore 36 as would be the usual 0 ring type of construction. This compression of 0 ring 76 is sufficient to assure that it seals against the side faces of the groove 76. 0 ring 76 also provides a seal against the wall of bore 36 to prevent bleeding of fluid from the lower valve chamber 24 into the upper spring chamber 22.

With this structure, the transmission of the fluid pressure from the area under the valve member 20 and in the vicinity of the valve seat 16 is transmitted through the passage 78, the groove 80, the recess 64 and the radial passages 74 into the interior of the groove 72. Since the 0 ring 76 is sealed against the sides of groove 72 and is resilient it is forced by the fluid pressure exerted thereon into frictional engagement with the wall of bore 36. This frictional engagement, which is pressure energized, provides the drag that prevents chattering movement of valve member 20. As long as there is a fluid pressure at the valve seat 16 the 0 ring 76 remains in its pressure energized condition creating the anti-chatter drag resisting rapid movements of valve member 20.

Figure 3:
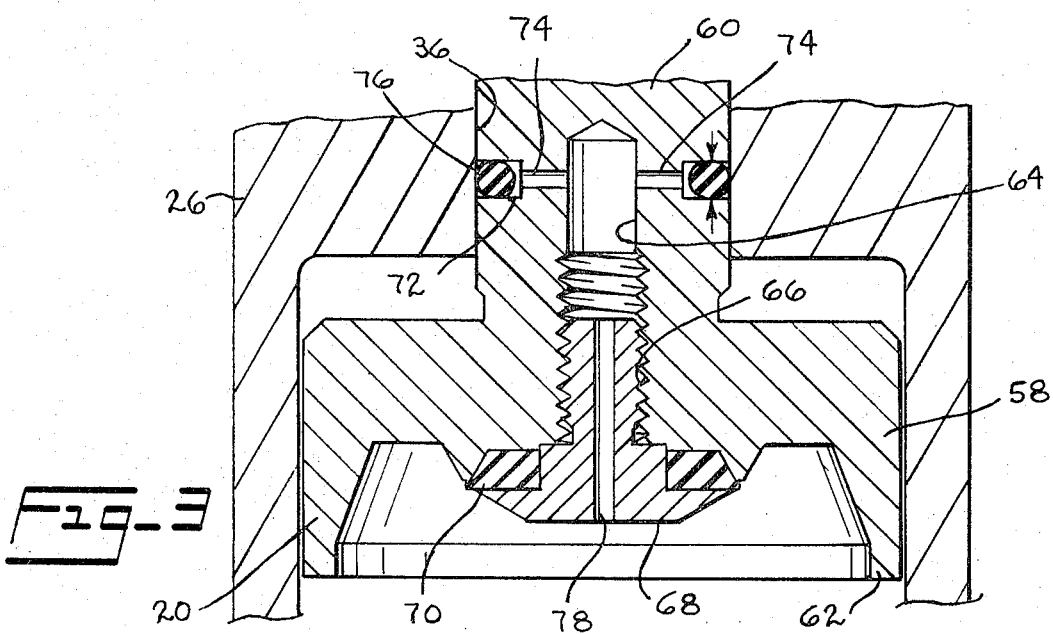
FIG. 3 is another detailed sectional view of a modified form of valve member.

The modified form of communication through the valve member 20 into the interior of the groove 72 is illustrated in FIG. 3. As shown the passage 78 extends axially through the retainer screw 68 to communicate with the recess 64. This provides the communication of fluid pressure from the inlet side of valve member 20 to the inner part of the groove 72 whereby 0 ring 76 is energized into frictional engagement with the wall of bore 36.

With both forms of the invention the fluid from the inlet 12, to which the seating side of valve member 20 is exposed, are at all times conducted into the interior of the groove 72 to energize or urge 0 ring 76 outward into frictional engagement with the walls of bore 36 to damp any tendency of the valve member 20 to chatter and thereby assure its smooth and quick movement.

From the foregoing it can be seen that the induced friction drag results from a simple pressure energized 0 ring. The 0 ring may be a standard product and thus the improved structure is simple in construction, inexpensive and effective to prevent valve chatter.

What is claimed is:

1. A valve, comprising
    a body defining an inlet, an outlet and a valve seat surrounding communication between said inlet and said outlet,
    a valve member positioned within said body and adapted to move within said body to open and close flow through said valve seat,
    said body defining a bore,
    a portion of said valve member extending into and reciprocating within said bore,
    said valve member portion defining a groove facing said bore,
    an O ring positioned in said groove and adapted to be in sliding engagement with the walls of said bore, and
    means providing pressure communication from the part of said valve member exposed to inlet fluids to the interior of said groove whereby fluid pressure forces said 0 ring against the walls of said bore to create a damping drag against the movement of said valve member.

2. A valve according to claim 1 wherein
    said groove has a width less than the cross-sectional diameter of said 0 ring to assure sealing of said 0 ring against the sides of said groove.

3. A valve according to claim 1, including
    means biasing said valve member toward said valve seat.

4. A valve according to claim 1 including
    a recess defined in said valve member extending axially thereof from the seating end into said valve member portion,
    a seating ring,
    a retaining screw threadedly engaging within the outer portion of said recess and engaging said seating ring to retain said seating ring in position on said valve member for engagement with said valve seat,
    said valve member portion defining a passage from said recess to the interior of said groove,
    said retaining screw defining a passageway from the inlet side of said valve member to said recess,
    said screw passageway, said recess and said passage to said groove providing said pressure communication means.

5. A valve according to claim 4 wherein
    said retaining screw includes a head and a threaded shank, and
    said screw passageway extends through said screw head and a groove defined along the length of said shank.

6. A valve according to claim 4 wherein
    said screw passageway extends axially through the center of said retaining screw.

* * * * *